No. 632,400. Patented Sept. 5, 1899.
B. E. CHOLLAR.
METHOD OF PURIFYING GAS.
(Application filed Apr. 22, 1899.)
(No Model.) 2 Sheets—Sheet 1.
Fig. I.
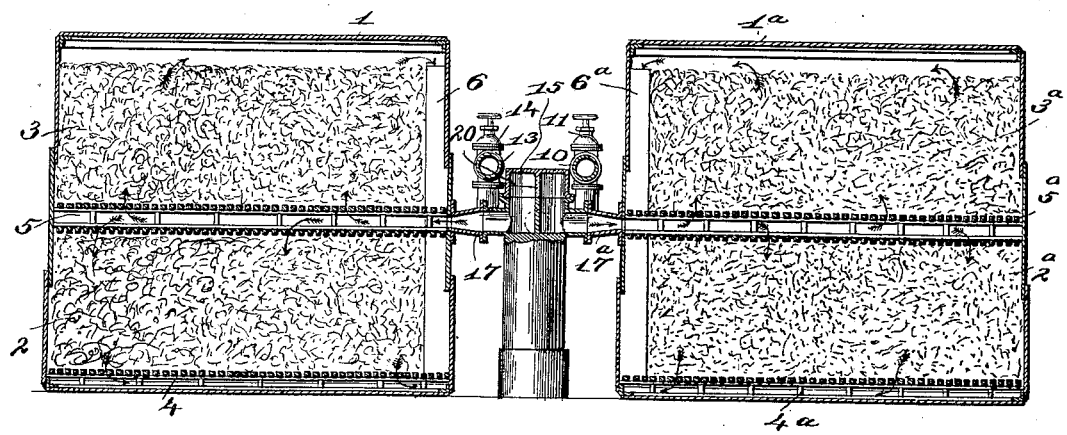
Fig. II.
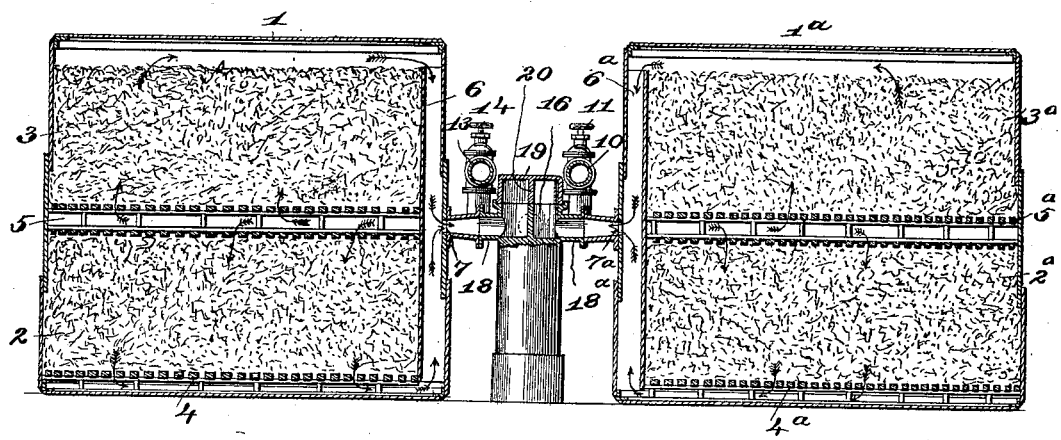
Witnesses
Inventor
Byron E. Chollar
By Knight Bro.
Attorneys
THE NORRIS PETERS CO., PHOTO-LITHO., WASHINGTON, D. C.

No. 632,400. Patented Sept. 5, 1899.
B. E. CHOLLAR.
METHOD OF PURIFYING GAS.
(Application filed Apr. 22, 1899.)
(No Model.) 2 Sheets—Sheet 2.
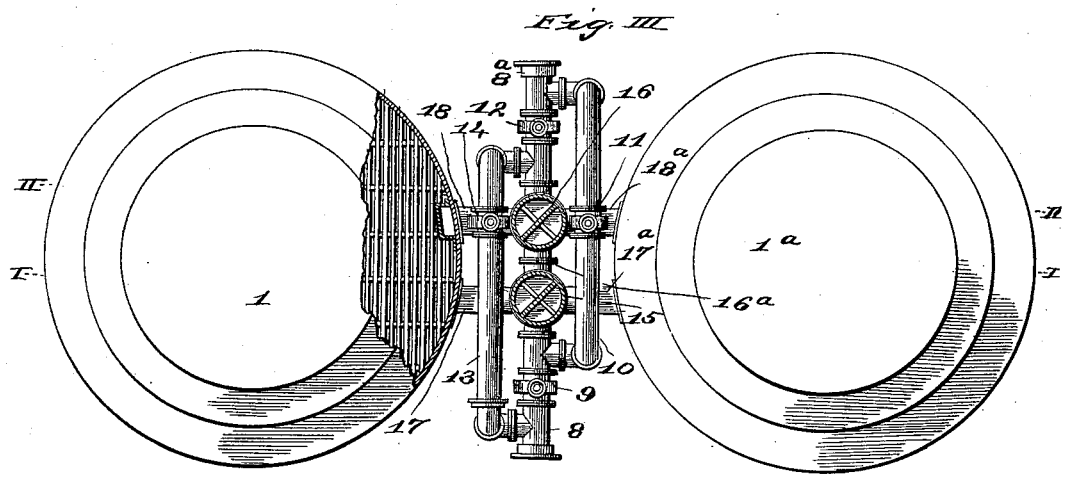
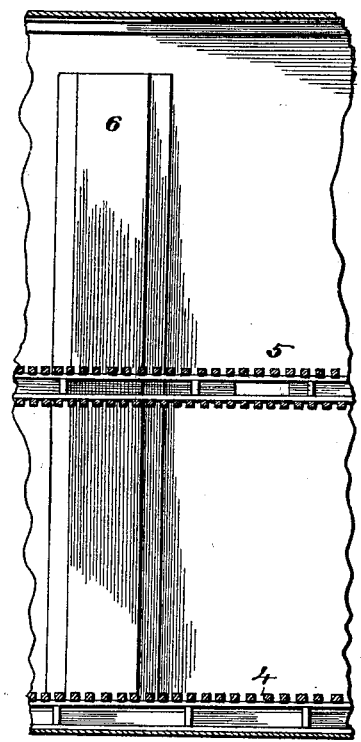
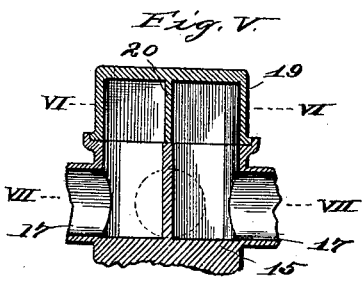
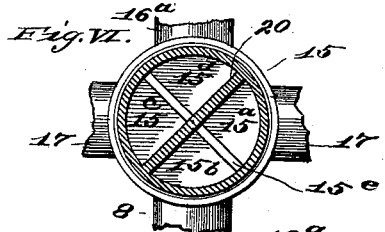
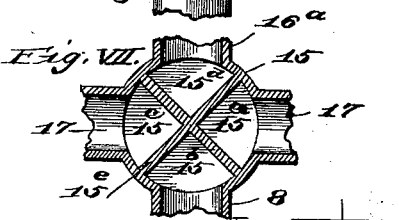
Witnesses:
G. A. Tauberschmidt,
E. S. Knight
Inventor:
Byron E. Chollar
By Knight Bro.
Attorneys

UNITED STATES PATENT OFFICE.

BYRON E. CHOLLAR, OF ST. LOUIS, MISSOURI.

METHOD OF PURIFYING GAS.

SPECIFICATION forming part of Letters Patent No. 632,400, dated September 5, 1899.

Application filed April 22, 1899. Serial No. 714,042. (No specimens.)

*To all whom it may concern:*

Be it known that I, BYRON E. CHOLLAR, a citizen of the United States, residing at the city of St. Louis, in the State of Missouri, have invented certain new and useful Improvements in Systems of Purifying Gas, of which the following is a full, clear, and exact description, reference being had to the accompanying drawings, forming part of this specification.

My invention relates to a system of purifying gas wherein the gas having oxygen mingled therewith is caused to flow through the purifying apparatus first in one direction and then in a reverse direction relative to the first flow for the purpose of reviving the fouled portion of purifying material through which the gas first passes in the process of purification.

In the purification of gas by metallic oxid the principal impurity sought to be removed is sulfureted hydrogen. The practice commonly in vogue is to pass the gas through beds or layers of purifying material in purifying-boxes in one general direction and in regular order of sequence. The prevailing idea in regard to the chemical reactions during the process of purification is that the sulfur of the sulfureted hydrogen combines with the iron of the ferric oxid, (which is the form of metallic oxid generally used,) resulting in the formation of sulfid of iron, a liberation of oxygen from the ferric oxid, which combines with the hydrogen of the sulfureted hydrogen to form water. After the oxid has become so thoroughly saturated with sulfid as to be no longer sufficiently active for the purpose intended it can be taken out of the boxes and exposed to the atmosphere, where by the action of the oxygen on the sulfid of iron the iron is converted back into its original form—ferric oxid. This saturation of the ferric oxid with sulfid and revivification may be carried on repeatedly. It has been found that by the admission of a small proportion of oxygen into the purifiers with the foul gas the process of revivification can go on in the purifiers simultaneously with the process of purification, the general reactions being as follows: The sulfur of the sulfureted hydrogen attacks the ferric oxid, reducing it partly to ferrous sulfid and partly to ferrous oxid. When atmospheric air is admitted, the air acts merely as a conveyer of oxygen, giving it up partly to the ferrous sulfid and partly to the ferrous oxid, thereby forming ferrous and ferric oxid over and over again, liberating sulfur at each change, which sulfur is deposited in metallic form among the purifying material.

From the foregoing it is evident, and, moreover, it is true, in fact, that having a bed of oxid, particularly a deep one, with a flow of gas containing sulfureted hydrogen and oxygen passing through it—upward, for illustration—the lower section of the bed having received the maximum quantity of sulfureted hydrogen in proportion to the oxygen will become converted into ferrous oxid, and therefore inert sooner than the portion nearer the top, where the proportion of the sulfureted hydrogen relative to the oxygen is materially less than exists at the period of the initial flow of the gas into the purifying-bed. It is also obvious, as well as true in practice, that if when the oxid at the bottom has become inert (by reason of its then consisting largely of ferrous oxid) the flow of crude gas be reversed, so as to take a directly contrary course to the flow just described, the oxid at what was previously the last portion of the purifying material through which the gas passed and which had to deal with the minimum amount of sulfureted hydrogen in proportion to the oxygen and which is then in substantially ferric state and in such condition that it can effectually take the place of the previously initially subjected portion of the bed of purifying material for the purpose of removing the sulfureted hydrogen; at such time the oxygen contained in the gas with the minimum proportion of sulfureted hydrogen in flowing through will reoxidize from a ferrous to a ferric state the portion of the bed of purifying material that was originally the entrance portion. Thus one portion of the purifying-bed may be utilized in carrying out the purification of gas while the other is becoming revivified by the action of the oxygen combining with the original oxid to return the elements contained thereby to their original component parts for utility on the next reversal of the flow of gas. Oxygen and air are used indiscriminately. Ozone can also be used as a conveyer for oxygen.

It will be observed that the reviving is accomplished when there is little or no sulfureted hydrogen present. The air, acting as a conveyer, gives up oxygen both to the ferrous sulfid and to the ferrous oxid, thereby forming ferric oxid again. This process is repeated over and over again, liberating sulfur at each change. While oxygen has been specified, it is evident that such oxygen may be introduced into the gas in any suitable form or by any suitable conveyer, it being preferable that atmospherical air be used.

It is, in line with the foregoing, the intention of my invention to carry out a process wherein I am enabled to revive the purifying material (iron oxid) by following a plan of reversing the direction of flow of the gas through the purifier as often as is advisable or necessary in order to change the chemical composition of the purifying material whenever it becomes fouled by the gas passing therethrough.

In the drawings I have shown a construction of purifying apparatus in the use of which my system may be carried out, though I do not limit myself to the particular form of apparatus shown.

Figure I is a vertical sectional view through the apparatus constructed in accordance with my invention, taken on the line I I, Fig. III. Fig. II is a vertical sectional view taken on the line II II, Fig. III. Fig. III is a top or plan view of the apparatus with a portion of one of the tanks thereof and the main controlling-valves shown in horizontal section. Fig. IV is an enlarged vertical sectional view of a portion of one of the purifier-tanks and the vertical duct-pipe located therein. Fig. V is a vertical sectional view of one of the main controlling-valves of the piping by which the purifier-tanks are connected. Fig. VI is a cross-sectional view taken on line VI VI, Fig. V. Fig. VII is a cross-sectional view taken on the line VII VII, Fig. V.

1 1$^a$ designate the purifier-tanks in pair, having beds of purifying material (iron oxid) 2 3 and 2$^a$ 3$^a$ therein. The beds of purifying material 2 2$^a$ are mounted on gridwork 4 4$^a$, and the said beds are surmounted by double layers of gridwork 5 5$^a$, within which are lateral passage-ways providing for the flow of gas therethrough to be delivered therefrom into the beds of purifying material or to receive the gas from the purifying material, according to the direction of its flow.

6 6$^a$ designate vertical pipes located against the walls of the purifier-tanks, adapted to convey the gas to be purified to the beds of purifying material, as will hereinafter appear, or to receive the flow of gas from said beds after it has passed therethrough. The pipes 6 6$^a$ communicate with openings 7 7$^a$ in the tank-walls, (see Fig. II,) said openings communicating with pipes to be hereinafter referred to.

8 8$^a$ designate pipes into either of which the gas to be purified may enter or through either of which it may be discharged. The pipe 8 is provided with a valve 9 and has connected to it a pipe 10, containing a valve 11, that leads to the pipe 8$^a$. The pipe 8$^a$ is provided with a valve 12 and has connected to it a pipe 13, containing a valve 14, said pipe 13 leading to the pipe 8.

15 designates a main controlling-valve into which the pipe 8 communicates, and 16 is a main controlling-valve into which the pipe 8$^a$ communicates. Communication is provided from the valve 15 with the purifier-tanks by pipes 17 17$^a$, and communication between the valve 16 and the purifier-tanks is obtained by pipes 18 18$^a$, that connect with said tanks at the openings 7 7$^a$, that communicate with the vertical pipes 6 6$^a$ within the purifier-tanks. The main valves 15 and 16 are intended for use in controlling the flow of gas from the pipe 8 or 8$^a$ into either purifier-tank first and to the other in sequence. The valves 15 and 16 are of substantially the same construction, and I will therefore describe in particular only the valve 15, which is shown in detail in Figs. V to VII, inclusive. This valve is divided into four compartments by partitions 15$^e$, arranged in the housing thereof in the form of a cross. (Shown clearly in Fig. VII.) The compartment 15$^b$ communicates with the pipe 8, the compartment 15$^c$ communicates with the pipes 17 and 17$^a$, and the compartment 15$^d$ communicates with a pipe 16$^a$, that leads to the interior of the main valve 16. The housing of the valve is surmounted by a cap 19, containing a single wing 20, extending thereacross. (See Figs. V and VI.) The cap 19 is movably mounted on the valve-housing, thereby allowing for its being turned therein to bring the wing 20 into line with either portion of the cross-partition 15$^a$ and close communication between any two of the compartments within the valve-housing, while affording communication between the remaining two compartments.

Having now described the apparatus, I will proceed to state the manner in which the flow of gas therethrough mingled with oxygen is controlled and the courses in which the flow of gas is directed therethrough.

In the first place, assuming, for illustration, the gas to be introduced through the pipe 8 and it to be desired to direct the flow of gas through the tank 1 in first one direction and then in reverse direction without the tank 1$^a$ being brought into use, in such instance the valve 9 would be closed and cause the gas to pass directly into the pipe 13. The valve 14 in said pipe 13 is open, the valve 12 in the pipe 8$^a$ is closed, and the main valve 16 is set, as seen in Fig. III. Under such conditions the gas flows through the pipe 8 into the pipe 13, past the valve 14, into the pipe 8$^a$, to the main valve 16, and therethrough to the pipe 18 and into the tank 1, entering the said tank through the opening 7 and flowing into the pipe 6. The gas flows from the pipe 6 at both top and bottom thereof and enters the beds of purifying material 2 and 3, passes therethrough to the double layer of gridwork 5, from the space between which it passes into the pipe 17, and therefrom to the main valve 15, which latter valve would be so set as to bring the wing 20 in the cap thereof into line with the other portion of the partition $15^e$ from that at which it is seen arranged in Fig. III, thereby causing the flow of gas to pass through the main valve 15 into the pipe 8, and therefrom into the pipe 10, owing to the valve 9 being closed. The valve 11 in the pipe 10 being open, the gas passes through said pipe to the pipe $8^a$ and is delivered therefrom to the point of discharge. Now if it is desired to reverse the flow of gas through the tank 1, so as to cause it to enter the tank through the pipe 17 and after flowing upwardly and downwardly through the layers of purifying material discharge through the pipe 6 into the pipe 18, the valve 14 of the pipe 13 is closed, as is also the valve 11, and the valve 9 is opened to permit the flow of gas from the pipe 8 directly into the main valve 15. The wing 20 in the cap of said valve under such conditions would remain in the position just described—viz., the contrary position to that seen in Fig. III—and the gas would then flow into the pipe 17 to the passage-way in the double gridwork 5, and therefrom in upwardly and downwardly directions into and through the layers of purifying material, and then into the pipe 6, from which it would emerge from the tank into the pipe 18 to the main valve 16, and thence through the pipe $8^a$ to the point of discharge, the valve 12 being open to permit the flow of gas past it.

Now if it be desired to cut out the tank 1 and convey gas to the tank $1^a$ and therethrough the valves 11 and 14 may be closed and the valve 9 opened to permit the passage of gas into the main valve 15, and therefrom through the pipe $17^a$, to and through the tank $1^a$ into the pipe $18^a$, under which condition the valve 16 being changed from the position seen in Fig. III the gas is permitted to escape through the pipe $8^a$, the valve 12 therein being open. To reverse the flow through the tank $1^a$, the valves 9 and 12 are closed and the valve 14 is opened. The gas would then flow from the pipe 8 through the pipe 13 into the pipe $8^a$, and the valve 16 being changed from the position in which it is seen set in Fig. III the gas would flow first through the pipe $18^a$ into the tank $1^a$, into the main valve 15, set as seen in Fig. III, then into the pipe 8 to the pipe 10, and therethrough past the open valve 11 into the outlet-pipe $8^a$.

It will now be assumed that it is desired to introduce the gas into the pipe 8 and direct it through the two tanks in sequence, in which instance the valve 9 would be opened and the valve 11 would be closed. The gas would therefore be caused to pass into the main controlling-valve 15, in which the wing 20 of the cap thereof would be arranged as seen in Fig. III, so as to direct the gas toward and into the pipe $17^a$. The gas would then flow through said pipe $17^a$ in the direction indicated by the arrow in said pipe in Fig. I and enter the purifier-tank $1^a$ through the opening communicating with said pipe, would flow into the passage-way in the double gridwork $5^a$, and therefrom into the beds 2 and $2^a$ of purifying material, in which it would take an upwardly and downwardly course, as indicated by the arrows, Figs. I and II, after which it would enter the pipe $6^a$ at its upper and lower ends and flow to the center of said pipe, where it would find outlet through the opening $7^a$ into the pipe $18^a$, thence into the main controlling-valve 16, the wing in the cap of which would be set, as seen in Fig. III, thereby causing the gas to flow into the pipe $16^a$ to the valve $15^a$ at the opposite side of the wing 20 from that at which it first passed through said valve. The gas would then flow into the pipe 17 and therethrough, as indicated in Fig. I, in the same manner, and enter the tank $1^a$ in the same manner and take the same course through said tank as that described in connection with the tank $1^a$. In leaving the tank 1 the gas would flow out through the pipe 8 into the valve 16 at the opposite side of the cap-wing therein from that at which it first passed through said valve and thence into the pipe $8^a$, from which it would be conducted to the gas-holder.

Assuming the gas to enter the apparatus through the pipe $8^a$, its flow through the apparatus would be precisely the reverse of that just described, and therefore the gas would first enter the tank $1^a$ through the pipe 6 and flow upwardly and downwardly therethrough, would enter the beds of purifying material at top and bottom and flow to the center of the purifier into the gridwork 5, therefrom into the pipe 18 and continue the reverse direction of flow from that first described, would pass through the valve 15 and pipe $16^a$, the valve 16, and the pipe 18 to the tank $1^a$, through which it would pass downwardly and upwardly to the center thereof, and then out through the pipe $17^a$, again through the valve 15 to the pipe 8 for discharge. By manipulating the valve-caps 19 so as to alter the position of the wings 20 therein the flow of gas to either purifier-tank first, as may be desired, may be controlled.

I claim as my invention—

The system of purifying gas consisting in effecting a flow of gas having oxygen mingled therewith, through purifying material in one general direction and then effecting a flow of gas having oxygen mingled therewith through the same material in a general direction to reverse of the preceding flow; substantially as and for the purpose set forth.

BYRON E. CHOLLAR.

In presence of—
E. S. KNIGHT,
G. A. TAUBERSCHMIDT.